Feb. 5, 1952 W. J. G. PALMER 2,584,912
CAMERA
Filed Aug. 6, 1947 3 Sheets-Sheet 1
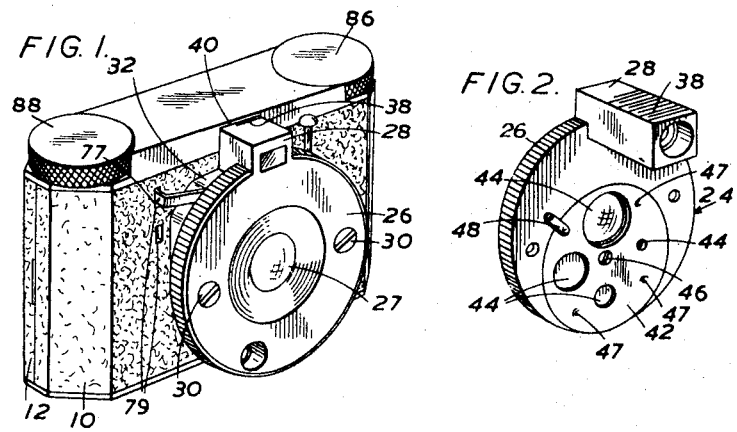
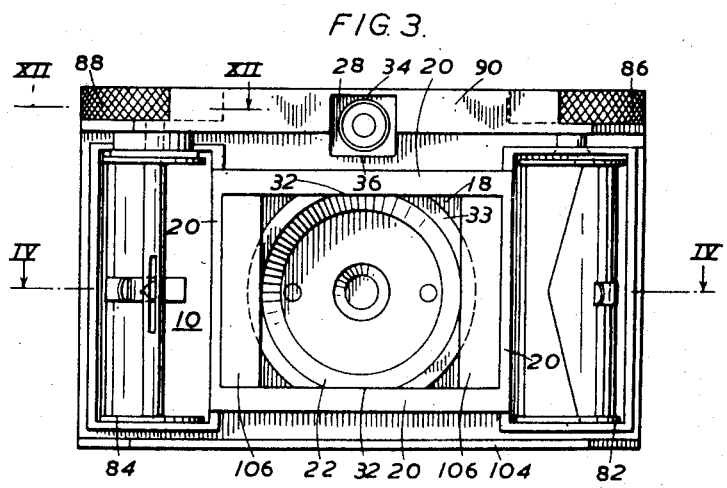
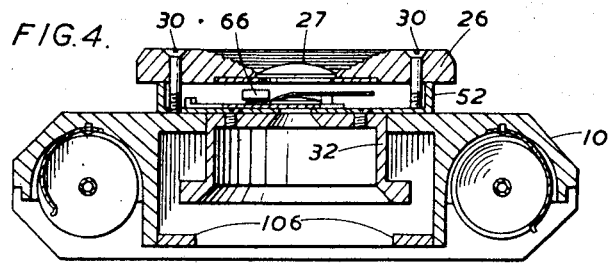
Inventor
William James Graham Palmer
By
Dowell and Dowell
Attorneys Feb. 5, 1952 W. J. G. PALMER 2,584,912
CAMERA
Filed Aug. 6, 1947 3 Sheets-Sheet 2

Inventor
William James Graham Palmer
By
Dowell & Dowell
Attorneys

Feb. 5, 1952  W. J. G. PALMER  2,584,912
CAMERA
Filed Aug. 6, 1947  3 Sheets-Sheet 3
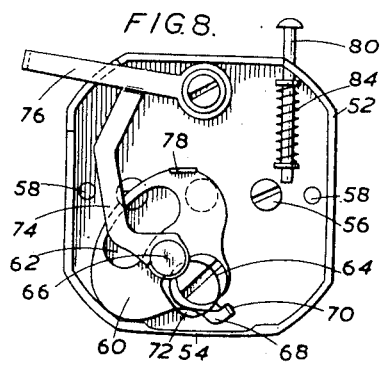
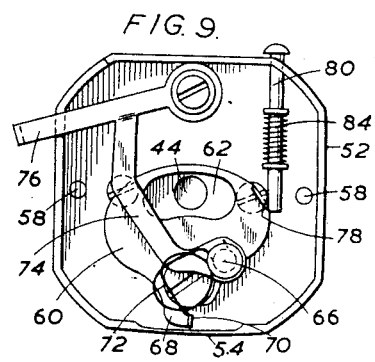
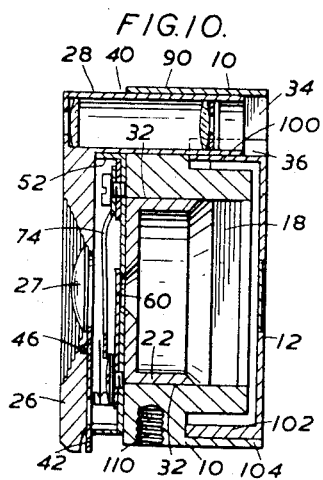
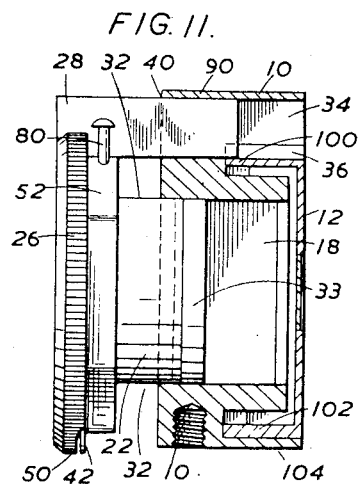
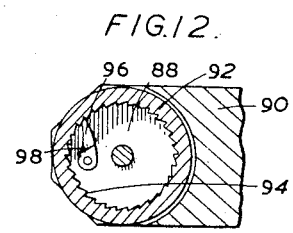

Patented Feb. 5, 1952

2,584,912

UNITED STATES PATENT OFFICE 2,584,912

CAMERA

William James Graham Palmer,
Surbiton, England

Application August 6, 1947, Serial No. 766,501
In Great Britain July 14, 1947

3 Claims. (Cl. 95—11)

This invention relates to miniature cameras, that is to say, to cameras using 35 mm. or smaller films.

The performance of such miniature cameras as are available to-day is very good indeed. This good performance is the result of the high degree of precision which is applied to the manufacture and to the matching of its components. The cost of production is necessarily very high and may even be considered to be disproportionate to the admittedly high performance.

The invention is concerned with the problem of producing a miniature camera at an incomparably smaller cost than that of the usual high precision camera but which nevertheless will give results which will more than merely satisfy the ordinary user.

In order to produce a really small camera the reflecting kind of view finder which is used in the reflex type of camera cannot be used. It is too bulky. The use of the prism type of view finder which is provided on the common form of folding camera is also precluded because it is difficult to find room for it and because it is not sufficiently accurate. The only type of view finder which is satisfactory from this point of view is the tubular or lens type which will be referred to herein for convenience as a "refraction" view finder.

The smaller the camera, the greater is the difficulty in providing adequate support for the parts which are moved for focussing purposes and it is an object of the invention to overcome this difficulty.

According to the invention a miniature camera is provided with a refraction view finder the optical elements of which and the camera lens are carried by a mount which for focussing purposes, is movable towards and away from the focal plane. Also, the optical axes of the lens and the view finder are maintained parallel to the axis of the camera by the cooperation of bearing surfaces on the case with a part of the mount and with a tubular guide to which the mount is attached and from which it is separable as a unit.

Preferably, the part of the mount which carries the view finder elements is arranged to slide in a slot in the case.

The construction of the lens mount and the view finder mount as a single unit enables a focussing scale to be provided which is appropriate to the lens. Thus, the unit can be mounted in a focussing jig and the scale can be inscribed or otherwise marked on any convenient part of the unit so as to be read against a fixed pointer or index mark on the case of the camera. This can be done before the unit is mounted in the case. Obviously, a much wider range of lenses can be utilised than when the lens has to be selected in accordance with the characteristics of the scale. Indeed, lenses which have been produced to a specification subject to quite generous tolerances and, therefore, quite cheaply, can be used.

The most convenient part of the unit on which to provide the focussing scale is the part of the mount which carries the view finder elements, in which event an edge of the camera case can constitute the fixed index mark.

A variable aperture is very desirable in a camera of the type in question but it is not essential that a complex diaphragm giving infinite aperture variation between upper and lower limits be provided. In the camera in accordance with the invention, an aperture plate having a number of holes of different sizes, say four, is used. This plate is, most conveniently, in the form of a disk mounted for rotation on the back of the lens mount so that the centre of one or another of its holes can be aligned with the optical axis of the camera. Detent means are preferably provided for yielding holding the aperture plate with any one of its holes so aligned. Also, it is advantageous for visual indicating means to be provided which show which one of the holes is in operation.

The shutter mechanism of the camera in accordance with the invention is also preferably carried by the mount. The mount can be made up of separate parts one carrying the lens and the other the view finder elements, rigidly fixed to each other; or it can be made in one piece, in which case, it can advantageously be made as a die-casting.

The case of the camera can also be of very simple construction. It is preferably made in two halves each being a die-casting. The front half has a chamber formed in it in which slides the tubular guide of the lens mount which can be formed with flats to prevent turning of the lens mount unit in the case and have a collar fixed to its rear end when the unit has been mounted in the case to prevent the unit from being pulled out of the case.

It is a simple matter to provide interengaging lips and grooves at the ends of the two halves of the case so that the two halves can be closed with a snap action and light proof joints can be effectively provided. Leakage of light between the sides of the two halves of the case is a less simple problem. According to the invention, the front half of the case is provided with rearwardly projecting walls defining the chamber in which the tubular guide is housed and the back half of the case has two side walls which, when the two halves are assembled project into the spaces between the side walls of the chamber and the sides of the front half of the case. A very effective and simple light trap is thus provided.

A case having no parts projecting from its sides is very desirable. This can be achieved in a camera in accordance with the invention by providing a two-piece case having one side wall of each half thicker than is required for structural strength and ease of manufacture and, indeed, thick enough to accommodate such parts as the film winding-on and winding-off knobs. The winding-on knob is preferably provided with means for allowing it to be rotated in one sense only. Such means can also be accommodated within the thickened wall provided in accordance with the invention. They can be in the simple form of a ratchet and pawl, the knob having an internal rim formed with ratchet teeth and a spring pawl being fixed to the case. Such ratchet teeth can be provided on any other surface of the knob, for example on its under surface.

In the preferred form of construction, the side wall of the front half of the case is thick enough to enable the part of the mount which houses the view finder elements and which is preferably of rectangular cross-section to be housed wholly within it.

In order that the invention may be thoroughly understood and be more readily carried into effect, an example of a camera in accordance with it will now be described with reference to the accompanying drawings in which—

Fig. 1 is a front perspective view of the camera,

Fig. 2 is a rear perspective view of the lens mount-view finder mount unit.

Fig. 3 is a rear elevation of the camera with the rear half of its case removed.

Fig. 4 is a section on the line IV—IV in Fig. 3.

Figs. 8 and 9 show the shutter mechanism in different operative positions.

Fig. 10 is a section taken on the line X—X in Fig. 7 but with the lensmount-view finder mount in position.

Fig. 11 is a section corresponding to that shown in Fig. 10 but with the lens mount-view finder mount unit shown in outside elevation and pulled out of the case to the limit and Fig. 12 is a section taken on the line XII—XII in Fig. 3.

Figure 5:
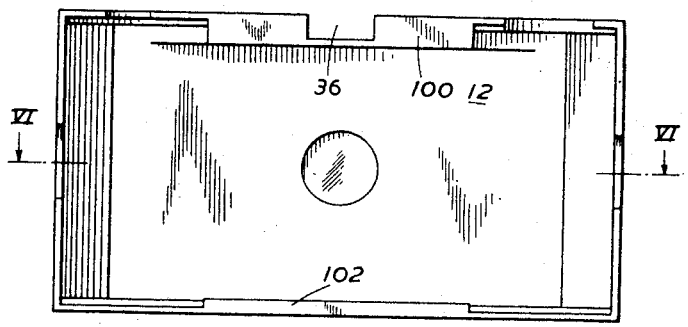
Fig. 5 is a rear elevation of the rear half of the camera case.

As can be seen in Figs. 1, 3-6, 10 and 11 the case of the camera comprises two halves 10, 12 provided respectively with lips and grooves to ensure light tightness and a snap-action closure. This is a common feature of camera cases.

The front half 10 of the case is provided internally with a rectangular chamber 18 bounded by four walls 20. Within the chamber 18 is mounted to slide a barrel or tubular extension 22 of a lens mount-view finder mount 24 shown separately in Fig. 2.

The unit 24 consists essentially of a mount 26 for the lens 27 and a view finder mount 28. These may be made integral with each other, for example, as a die casting or as separate parts rigidly fixed together. The lens mount 26 is fixed by screws 30 to the barrel 22 which is provided with flats 32 engaging the side walls 20 of the chamber 18 and thus forms a guide for the unit 24 and prevents it from rotating relatively to the case. When the unit 24 and its barrel 22 have been mounted in the case, a ring 33 is fixed to its rear end, this ring also having flats corresponding to the flats 32 and serving to prevent removal of the unit from the case. The view finder mount 28 is mounted to slide in slots 34 and 36 in the two halves of the case. The flats 32 are not entirely necessary as the view finder mount will effectively prevent rotation of the unit relatively to the case. The screws 32 could, of course, be replaced by rivets and are preferably hidden by a sealing ring (not shown) attached to the front of the unit.

The camera is focussed by sliding the unit 24 into and out of the case, the top of the view finder mount 28 being provided with a focussing scale 38 which can be read against the edge 40 of the slot 34 in the front half 10 of the case.

The scale 38 is marked on the unit before the unit is mounted in the case, this being done while the unit is in a focussing jig in which the positioning of the scale is determined in accordance with the characteristics of the lens. Any unit so calibrated can be used in a standard case without the necessity for matching the lens, the scale and the case after the unit has been mounted.

On the back of the unit 24 is mounted an aperture plate 42 having four holes 44 of different sizes in it. It is held by means of a screw 46 on which it can be turned so as to bring the centre of any one of the holes 44 into alignment with the optical axis of the lens 27. The light admission aperture of the lens can thus be varied. In order to ensure proper positioning of the holes 44, the aperture plate is formed with four dimples 47 and a spring 48 fixed to the unit 24 bears on the plate so as to form a detent with the dimples which will hold the plate yieldingly in the proper position. The lens mount 26 is slightly cut away as shown at 50 in Fig. 11 to make the aperture plate accessible from the outside of the case and enable it to be rotated by means of a finger.

A hole 51 in the lens mount is provided through which the aperture plate can be seen. By suitably marking the aperture plate visual indicating means are thus provided allowing it to be ascertained at a glance which of the apertures is in operation.

Figure 7:
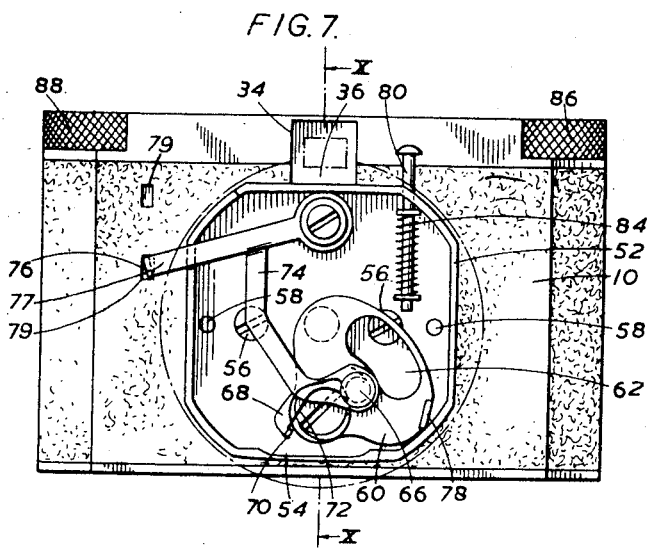
Fig. 7 is a front elevation of the camera with the unit shown in Fig. 2 removed and showing the shutter mechanism.

Between the lens mount and the guide 22 is provided a motion box 52 housing the shutter mechanism shown in Figs. 7-9. The box 52 has a slot 54 cut in it through which the aperture plate 42 projects. It is fixed to the barrel 22 by screws 56 and has holes 58 in it through which pass the screws 30 by means of which the unit 24 is fixed to the guide.

The shutter mechanism comprises a plate 60 pivotally mounted on a screw 64 and having an elongated aperture in it. On the side of the screw 64 remote from the aperture, the plate 60 has a tail from which projects a lug 70. This lug is connected by a hair spring 72 to a pin 66 carried by an arm 74 of a trigger 76 pivotally mounted at 75.

Fig. 7 shows the shutter mechanism in one of the positions in which the lens aperture is closed. It will be seen that the axis of the pin 66, that of the screw 64 and the lug 70 are all aligned. In these circumstances, the hair spring 72 does not tend to move the plate 60. When, however, the trigger is moved into the position shown in Fig. 8, the pin 66 is turned counter clockwise out of alignment with the screw 64 and the lug 70 so that the spring 72 causes the plate 60 to be moved rapidly into the position shown in Fig. 8, passing through the position shown in Fig. 9 in which the hole 44 in the aperture plate and, therefore, the lens, is uncovered. An "instantaneous" exposure in thus obtained.

In the position of Fig. 8, the pin 66, the screw 64 and the lug 70 are once again aligned and if the trigger 76 be depressed, the shutter will be moved back rapidly by the spring 72 to the position of Fig. 7. The shutter is thus operable in both of the two positions of the trigger.

The shutter plate 60 can be held in the position shown in Fig. 9 when it is desired to maintain an exposure for a definite time. This is made possible by the provision of a lug 78 on the plate 60 and of a stop pin 80 which is mounted in the motion box 82 and is urged upwards by a spring 84.

If, with the trigger in the position shown in Fig. 8, the stop pin 80 is depressed and the trigger then operated, the parts will take up the positions shown in Fig. 9 and will maintain those positions until the stop pin is released, whereupon, the shutter plate will move to the position shown in Fig. 7. Thus, the aperture will remain open as long as the stop pin is held depressed. If the pin is depressed with the parts in the positions shown in Fig. 7 and the trigger is then lifted, the lug 78 will be brought up against the right hand side of the stop pin with the same consequences as before.

The usual winding-off and winding-on spools 82 and 84 are provided for the film in recesses in the ends of the case. The usual winding-off and winding-on knobs 86 and 88 are also provided. These knobs are flush with the sides of the case, the side wall 90 of the front half of the case being thickened to enable the knobs to be so mounted in recesses in its ends. The winding-on knob 88 is provided with means allowing it to be turned in one sense only. As seen in Fig. 12, it is made hollow and its rim 92 is provided internally with ratchet teeth 94 and a pawl 96 having a spring 98 is mounted in the recess in the wall 90 to engage the ratchet teeth. The thickness of the wall 90 is such that the ratchet teeth 94 can, if desired, be formed on the underface of the knob instead of on the inside of the rim.

The thickened wall 90 also enables the view finder mount so arranged within it so that there are no projections at all from the side of the case.

Figure 6:
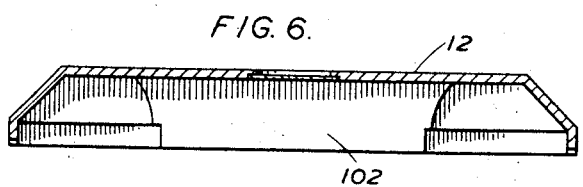
Fig. 6 is a section on the line VI—VI in Fig. 5.

The interfitting lips and grooves at the ends of the two halves of the case ensure effective exclusion of light at the ends. The two halves cannot, however be similarly interfitted along their sides and light tightness has to be ensured in a different manner. As seen in Figs. 6, 10 and 11 the rear half 12 of the case has side walls 100, 102 which project down into the spaces left between the side walls 90 and 104 of the front half 10 of the case and the side walls 20 of the chamber 18. The direct passage of light through any clearance which may exist between the two halves of the case is thus prevented.

The chamber 18 is shown to be longer than it is broad. Correspondingly shaped pictures will, therefore, be produced. This is usual practice but is not good practice because the field of the lens is circular and outside the circular field distortion increases rapidly. A square picture is much more free from distortion and, therefore, a mask can usefully be fitted to reduce the length of the chamber 18. Alternatively filling pieces 106 can be provided as shown in Fig. 3. The chamber 18 could, of course, be made square in manufacture in which case, the parts 106 could be integral with the rest of the front part of the camera case.

In order to prevent accidental operation of the shutter when the camera is not in use, the end of the trigger 76 can be bent over as shown at 77 and the case be provided with a pair of slots 79 in one of which the end 77 will engage when the lens mount unit is pushed fully home into the case.

The case is provided with a tapped hole 110 to enable the camera to be mounted on a tripod.

I claim:

1. A roll-film photographic camera for 35 mm. or smaller films comprising a two-piece case, one piece of said case forming a front wall, peripheral walls and at least one marginal portion of a back wall and the other piece completing with said marginal portion the back wall of said case, a slot in said case terminating in an opening in said front wall and in an opening in said back wall formed partly in each of said two pieces of said case, a view finder comprising optical elements housed in a casing of the same cross section as said slot and mounted to slide therein, a camera lens, a mount for said lens depending rigidly from said view finder casing, a further opening in the front wall of said case and a tubular rearward extension of said mount mounted to slide in said further opening.

2. A roll-film photographic camera as claimed in claim 1 in which said slot and said view finder casing are of non-circular outline.

3. A roll-film photographic camera as claimed in claim 1 in which said slot is bounded by surfaces with which said view finder casing is in contact over the whole of that part of it which lies within the case.

WILLIAM JAMES GRAHAM PALMER.

REFERENCES CITED

The following references are of record in the file of this patent:

UNITED STATES PATENTS

| Number | Name | Date |
|--------|------|------|
| 435,080 | Tobias | Aug. 26, 1890 |
| 461,308 | Blair et al. | Oct. 13, 1891 |
| 1,187,884 | Brigden | June 20, 1916 |
| 1,593,687 | Bornman | July 27, 1926 |
| 1,787,797 | Riddell | Jan. 6, 1931 |
| 2,001,840 | Gauthier et al. | May 21, 1935 |
| 2,011,432 | Barenyi | Aug. 13, 1935 |
| 2,046,580 | Premo | July 7, 1936 |
| 2,168,977 | Crumrine | Aug. 8, 1939 |
| 2,208,797 | Kende | July 23, 1940 |
| 2,292,217 | Drotning et al. | Aug. 4, 1942 |
| 2,309,403 | Kosken et al. | Jan. 26, 1943 |
| 2,320,423 | Githens et al. | June 1, 1943 |
| 2,351,999 | Nerwin | June 20, 1944 |

FOREIGN PATENTS

| Number | Country | Date |
|--------|---------|------|
| 525,835 | France | June 16, 1921 |